US006357097B1

(12) United States Patent
Lundgreen et al.

(10) Patent No.: US 6,357,097 B1
(45) Date of Patent: Mar. 19, 2002

(54) HUB PULLER FOR FRONT WHEEL DRIVE VEHICLES

(75) Inventors: James M. Lundgreen, Owatonna; Larry W. Betcher, Northfield; Dennis D. Hanson, Medford, all of MN (US)

(73) Assignee: SPX Corporation, Muskegon, MI (US)

( * ) Notice: Subject to any disclaimer, the term of this patent is extended or adjusted under 35 U.S.C. 154(b) by 0 days.

(21) Appl. No.: 09/577,871

(22) Filed: May 24, 2000

(51) Int. Cl.[7] ................................................ B23P 19/04

(52) U.S. Cl. ........................................................ 29/263

(58) Field of Search .......................... 29/263, 257, 256, 29/264, 265, 266

(56) References Cited

U.S. PATENT DOCUMENTS

| | | | | |
|---|---|---|---|---|
| 1,879,335 A | * 9/1932 | Kulp et al. | .................. | 29/263 |
| 3,009,313 A | * 11/1961 | Wheeler | ...................... | 29/257 |
| 5,067,220 A | * 11/1991 | Combs et al. | | |

* cited by examiner

*Primary Examiner*—Robert C. Watson
(74) *Attorney, Agent, or Firm*—Baker & Hostetter LLP

(57) ABSTRACT

A hub puller device to simplify the removal of the hub from the wheel bearing on front wheel drive cars when maintenance is required. In the preferred embodiment, the device includes a U-shaped frame, a forcing screw, traveling nut and a pushing piece. A maintenance technician installs the forcing screw to extend through the open cylindrical section of the hub and mounts the pushing piece and the traveling nut on the forcing screw adjacent the cylindrical section. Next, the technician installs the frame to wrap around the spindle housing such that one member abuts the front surface of the spindle housing. The other frame member braces the receiving end of the forcing screw and prevents linear movement of the forcing screw. With the setup completed, the maintenance technician rotates the forcing screw and prevents rotation of the traveling nut. The rotational motion of the forcing screw is translated to linear movement of the traveling nut, which pushes against the pushing piece to eject the cylindrical portion of the hub from the wheel bearing.

7 Claims, 3 Drawing Sheets

HUB PULLER FOR FRONT WHEEL DRIVE VEHICLES

TECHNICAL FIELD

This invention relates to the field of automotive maintenance tools, and more particularly, to front wheel drive hub pullers.

BACKGROUND

Wheel hubs on many front wheel drive vehicles are machine press-fitted into the wheel bearing with thousands of pounds of pressure. On occasion, the hub must be removed to perform maintenance of the wheel or brake assembles. Removal of the entire spindle housing, which contains the wheel bearing and the hub, for hub removal in a commercial press, necessitates additional work and expense, including a front-end alignment. Slide hammers have been used to remove hubs while the spindle housing is still in place, but they lack sufficient force to remove some hubs. Other hub pullers are heavy and awkward to use, requiring multiple workers to setup and/or operate. Additionally, in some cases they damage otherwise reusable wheel components.

SUMMARY OF THE INVENTION

The present invention overcomes the disadvantages of prior art tools and provides an easier-to-use hub puller that can be operated by a single individual.

The preferred embodiment utilizes a generally U-shaped frame that results in a wrap-around design with one member of the frame in front of the spindle housing and the other member of the frame behind the spindle housing. The wrap-around design takes advantage of access allowed by the removal of the brake caliper, which is required whenever a hub is pulled. By using this access, the present invention minimizes the size and weight of the device. This weight reduction markedly reduces the effort required for operational set-up, allows a single person to perform the maintenance and thus reduces cost.

In addition to the U-shaped frame, the present invention generally includes a rotatable forcing screw, a pushing piece and a traveling nut. With the invention mounted on an in-place spindle housing, the operator rotates the forcing screw while holding the traveling nut so as to prevent rotation of the traveling nut. The spindle housing front surface braces the U-shaped frame, which in turn, provides an immobile backstop for the forcing screw. Rotation of the forcing screw translates into linear motion of the traveling nut and pusher piece. The rigid frame prevents linear motion of the forcing screw, placing the portion of the forcing screw between the traveling nut and the frame under compressive tension. Using this tension, the traveling nut forces the pusher piece against a cylindrical section of the hub, pushing it out of the wheel bearing.

The present invention ensures interoperability with the wide variety of wheel spindle housings and brake rotor designs in commercial use. Additionally, an adaptor further expands applicability to a large range of different sized commercial spindles.

DETAILED DESCRIPTION OF THE PREFERRED EMBODIMENT

Figures 1, 2, 3, 4:
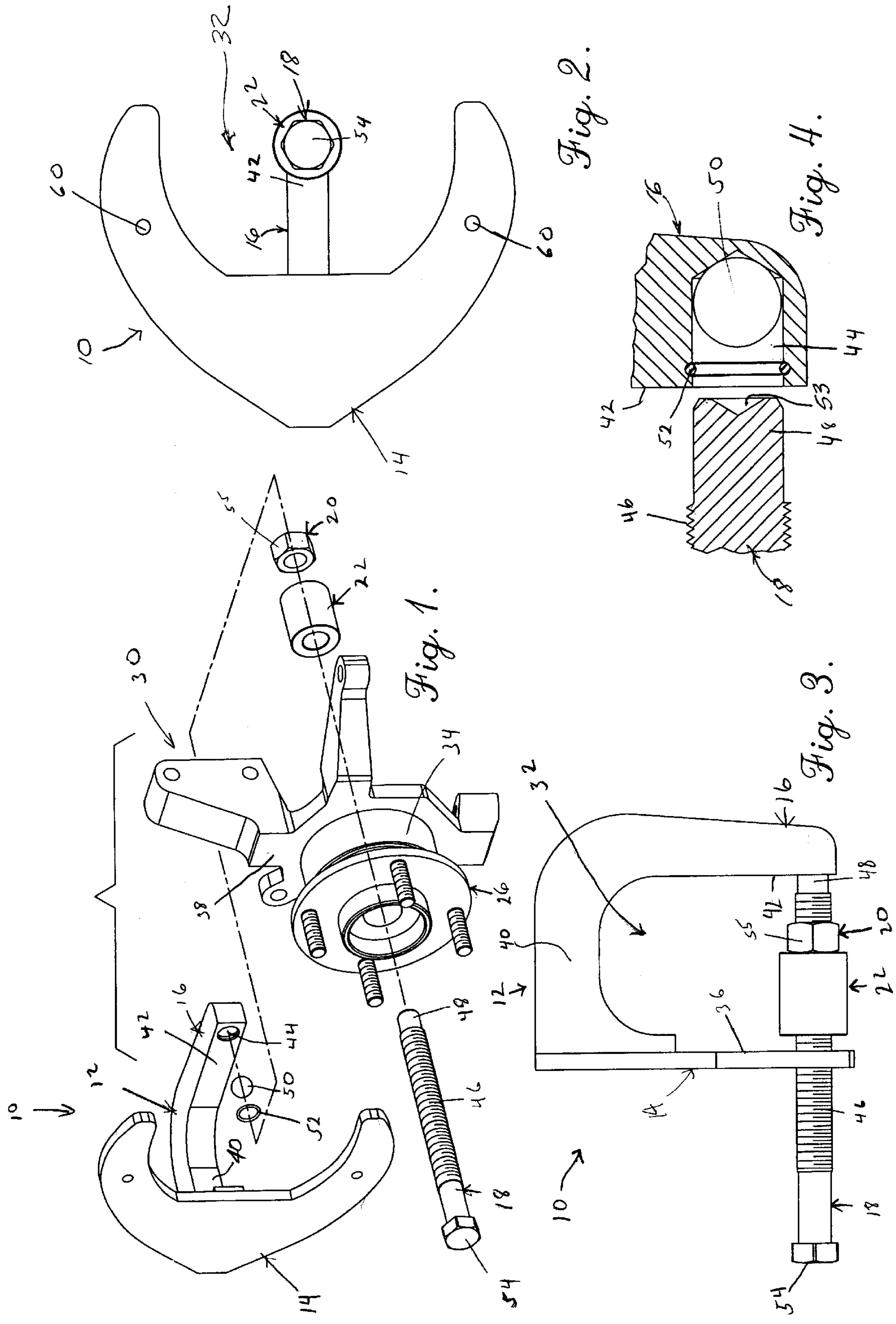
FIG. 1 is an exploded view of a preferred embodiment of the device shown relative to a spindle housing.
FIG. 2 is a front elevational view of the device.
FIG. 3 is a side elevational view of the device.
FIG. 4 is an enlarged, fragmentary exploded cross sectional view illustrating the relationship between the receiver end of the forcing screw and a recess in the forcing screw receiver member of the frame.
Figure 8:
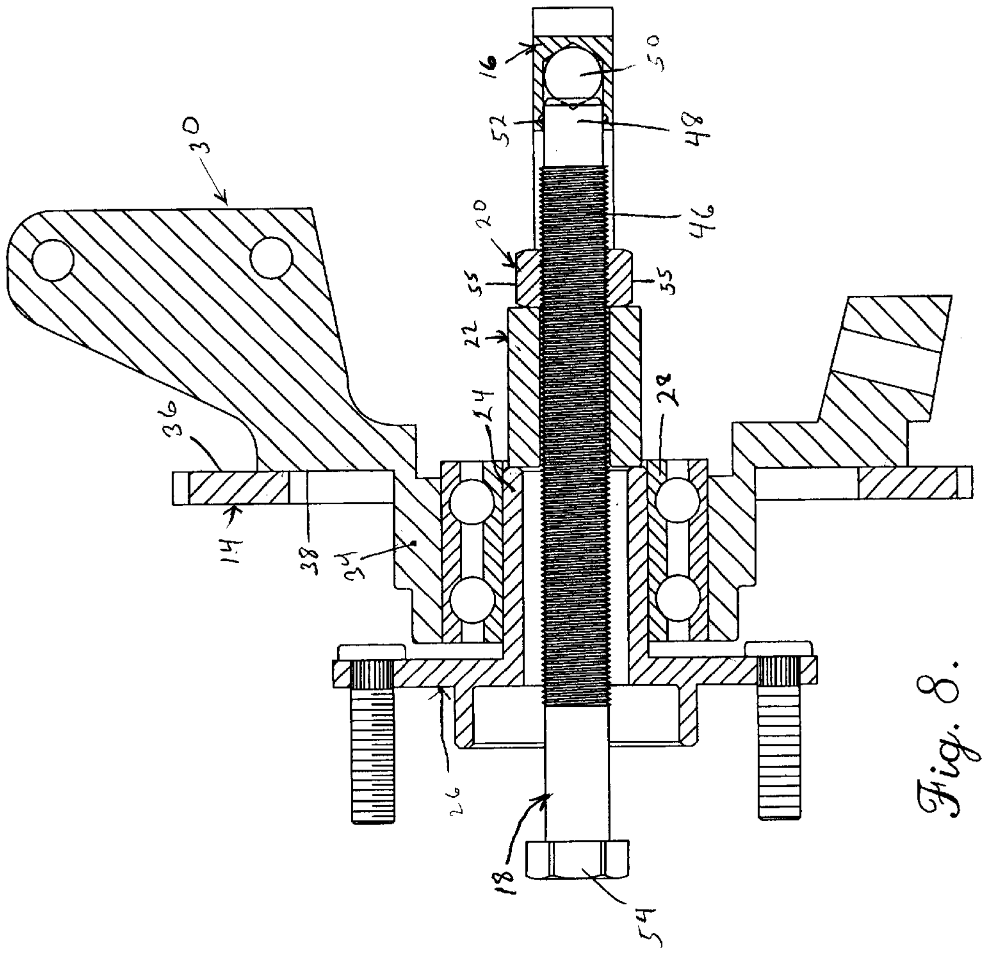
FIG. 8 is a further enlarged transverse cross-sectional view of the device and spindle housing taken substantially along line 8—8 of FIG. 6.

FIG. 1 illustrates the preferred embodiment of a hub puller device 10. The device 10 broadly includes a U-shaped frame 12 with a generally C-shaped member 14 and an opposed forcing screw receiving member 16, a forcing screw 18, a traveling nut 20 and a pushing piece 22. As shown in FIG. 8, a cylindrical section 24 of a hub 26 is pressure fitted within a wheel bearing 28 which is contained in a spindle housing 30. Spindle housing 30 presents a spindle housing front surface 38. The U-shaped frame 12 wraps around the spindle housing 30 with the forcing screw 18 extending through the hub 26.

Figure 5:
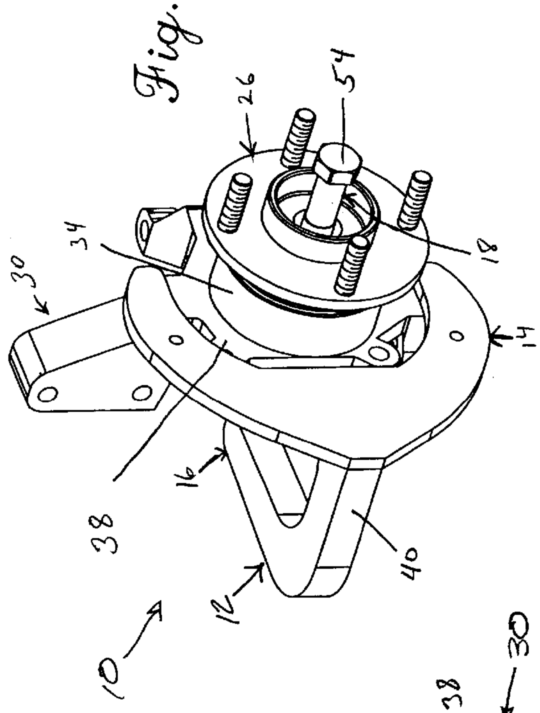
FIG. 5 is an isometric view of the device in a use position mounted on a spindle housing.
Figure 7:
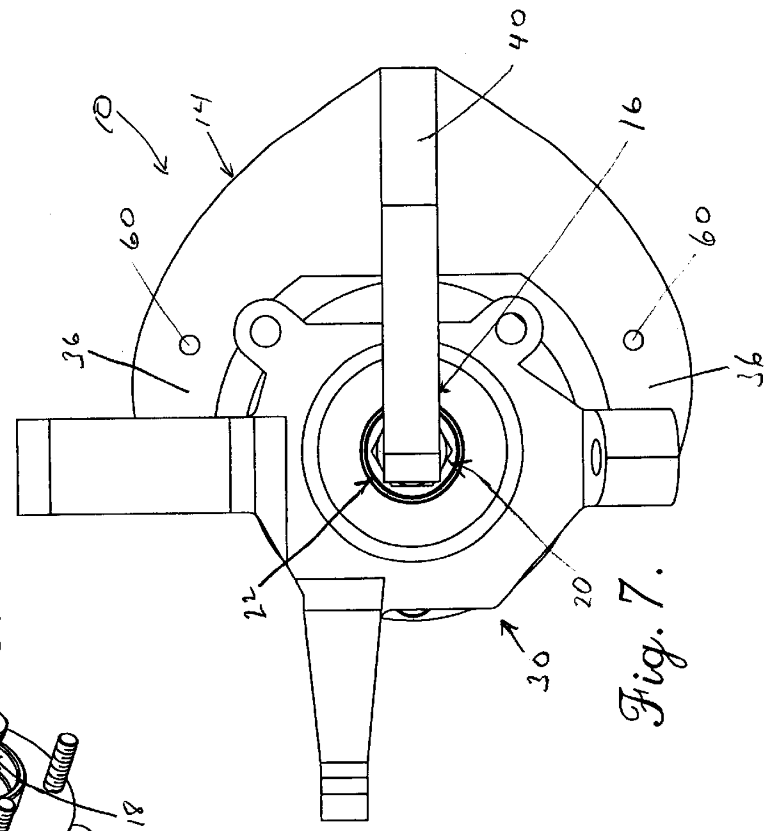
FIG. 7 is a rear elevational view of the device in the use position of FIG. 5.
Figure 6:
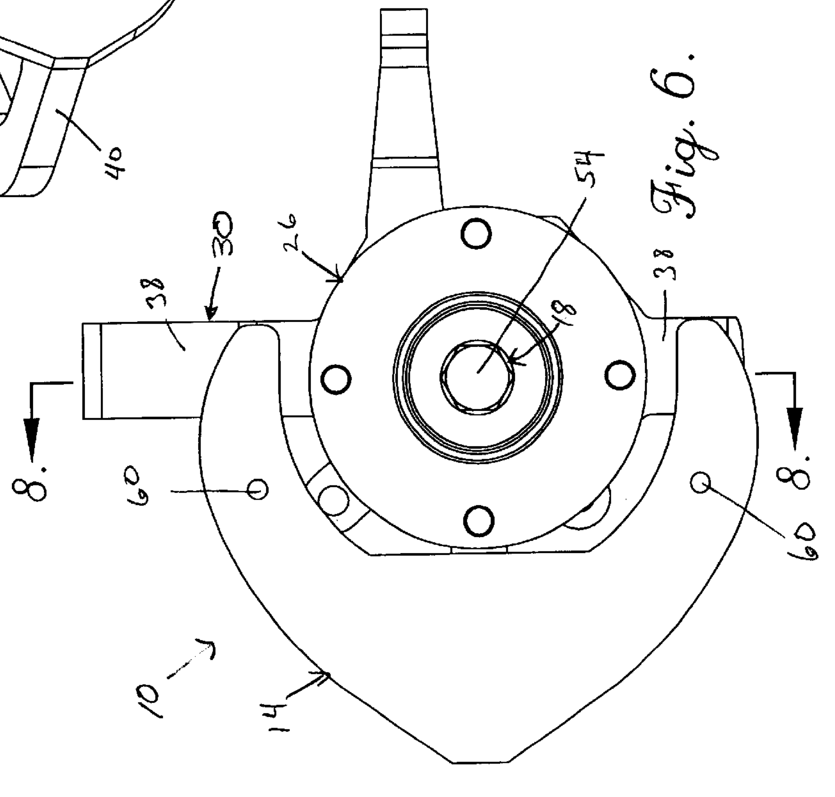
FIG. 6 is a front elevational view of the device in the use position of FIG. 5.

As shown in FIGS. 2, 5 and 8, C-shaped member 14 provides a central cavity 32 sized to receive a spindle cylindrical portion 34. An inner face 36 of C-shaped member 14 abuts spindle housing front surface 38 when the spindle cylindrical portion 34 is received in central cavity 32.

U-shaped frame 12 is a rigid, stout frame, with a bight 40 connecting C-shaped member 14 and receiving member 16 so as to resist spreading of members 14 and 16. In the preferred embodiment, receiving member 16 is a stout bar and presents an inner surface 42. Inner surface 42 faces inner face 36 and is generally centered opposite central cavity 32. An unthreaded receiver recess 44 is located on the inner surface 42, in registry with central cavity 32.

Forcing screw 18 includes a threaded portion 46 and an unthreaded receiver end 48. Receiver end 48 is sized to fit in receiver recess 44 in such a manner that forcing screw 18 can be freely rotated. In the embodiment shown in FIG. 4, a friction reducing ball 50 is positioned in the receiver recess 44 and retained by an O-ring 52. The tip of receiver end 48 presents a conical indentation 53 which bears against the ball 50 in operation. When positioned in receiver recess 44, the forcing screw 18 extends through the approximate center of central cavity 32. Forcing screw 18 is illustrated with a stud type head 54 with wrench flats, but those skilled in the art understand that other constructions are possible.

Pushing piece 22 has an outside dimension smaller than wheel bearing 28 and larger than the internal diameter of cylindrical section 24. Pushing piece 22 is hollow and in operation, is concentrically mounted on forcing screw 18 such that pushing piece 22 moves freely along forcing screw 18. Again, while the preferred embodiment of the pushing piece 22 is cylindrical, other structures are possible.

Traveling nut 20 is a standard nut, threaded to match threaded portion 46 and presents at least a pair of flat surfaces 55 that allow an operator to prevent rotation of traveling nut 20. Traveling nut 20 is mounted on threaded portion 46 between pushing piece 22 and receiver end 48.

It will be recognized that nut 20 and piece 22 collectively comprise what can be termed a hub mover. In the preferred embodiment they are separate elements, but in an alternative embodiment nut 20 and piece 22 may be physically attached to one another or integrated into a single unit.

In operation, the mechanic inserts receiver end 48 of forcing screw 18 through cylindrical section 24, with head 54 extending out from hub 26 sufficiently to allow continued access. Pusher piece 22 and traveling nut 20 are placed on forcing screw 18 over receiver end 48. The operator then screws traveling nut 20 onto threaded portion 46. With the forcing screw 18 resting in the cylindrical section 24, the mechanic positions U-shaped frame 12 to wrap around the spindle housing 30 with inner face 36 abutting spindle housing front surface 38. He then places receiver end 48 in receiver recess 44 and rotates traveling nut 20 away from receiver end 48, moving pushing piece 22 to engage cylindrical section 24. The mechanic completes this simplified setup by ensuring pushing piece 22 firmly engages cylindrical section 24 and clears wheel bearing 28.

To operate the device 10, the mechanic rotates forcing screw 18 while holding traveling nut 20 to prevent rotation. Typically, the operator would use a pneumatic tool to turn forcing screw 18 while holding traveling nut 20 with a wench. While receiver end 48 spins freely against ball 50 in receiver recess 44, forcing screw receiving member 16 prevents axial movement of forcing screw 18. Therefore, the rotational motion of forcing screw 18 is converted to linear movement of the non-rotating traveling nut 20. Traveling nut 20 pushes against pushing piece 22, to force cylindrical section 24 out of wheel bearing 28, freeing hub 26. While cylindrical section 24 is pushed out, forcing screw 18 is subject to compressive forces between traveling nut 20 and receiver end 48. U-shaped frame 12 wraps around spindle housing 30 to transfer that force from receiving member 16 to spindle housing front surface 38.

As can be seen from the above, setup of this device 10 is enhanced by the smaller size and lighter weight of U-shaped frame 12. One individual can complete the entire hub pulling operation, resulting in reduced cost and increased user flexibility.

In some cases, a dust cover (not shown for clarity) is present adjacent the spindle housing front surface 38. The dust cover maybe retained between the inner face 36 and the spindle housing front surface 38 without impeding the function of device 10.

Figure 9:
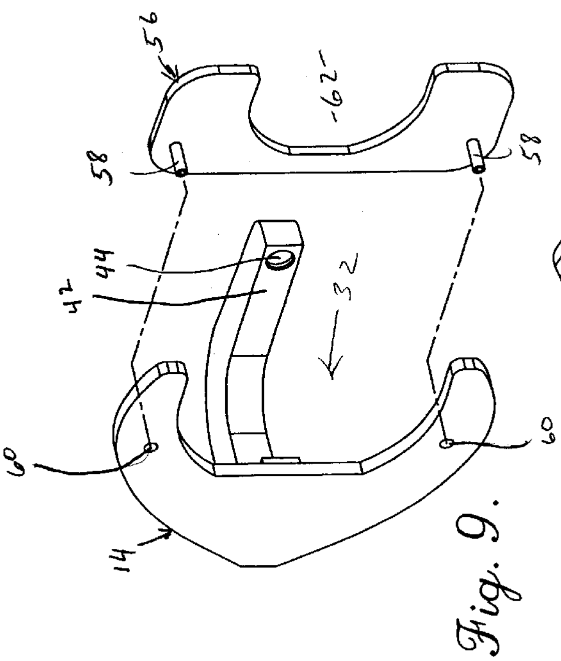
FIG. 9 is an exploded isometric view of a frame and a detachably mountable C-shaped adaptor.
Figure 10:
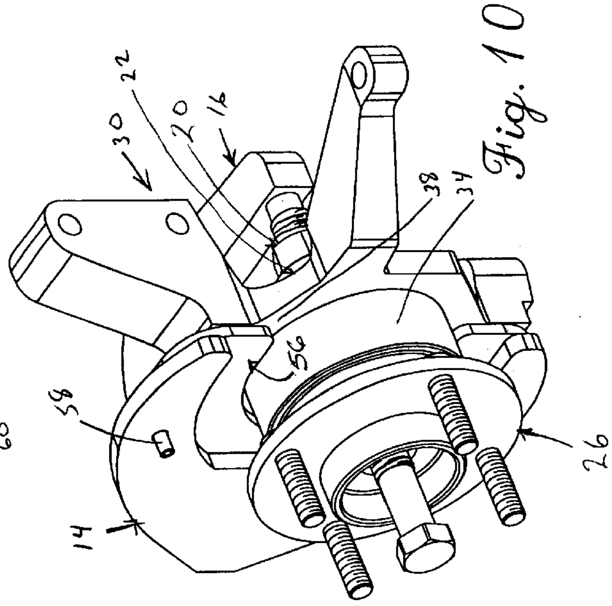
FIG. 10 is an isometric view of the device with the adaptor, mounted in a use position on a spindle housing.

FIGS. 9 and 10 show a mountable adaptor 56 with a smaller cavity 62, which permits modification of the size of central cavity 32 to receive various smaller sized spindle cylindrical portions 34, which are encountered in use. FIG. 9 shows one embodiment where a pair of attachment pins 58 on adaptor 56 and a pair of locating holes 60 on C-shaped member 14 are used to mount adaptor 56, but other methods of mounting could be employed.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of their invention as pertains to any apparatus not materially departing from but outside the literal scope of the invention as set out in the following claims.

We claim:

1. A hub puller for removing the hub from a wheel bearing, the hub puller comprising:

a frame having a pair of opposed members;

a forcing screw having a threaded portion;

said forcing screw engaging one of said members in such a manner that said forcing screw may be rotated relative to said one member without causing axial translation of said screw;

a hub mover threadably engaged with said threaded portion of said forcing screw such that when said forcing screw is rotated and said hub mover is held to prevent rotation with said forcing screw, said hub mover translates axially along said threaded portion of said forcing screw away from said one member and toward the other member, said other member being generally C-shaped presenting a central cavity; and a generally C-shaped adaptor presenting a second cavity, smaller than said central cavity, said C-shaped adaptor being detachably mountable to said structure such that said second cavity is concentric with said central cavity.

2. A hub puller for removing the hub from a wheel bearing, the hub puller comprising:

a frame having a pair of opposed members;

a forcing screw having a threaded portion;

said forcing screw engaging one of said members in such a manner that said forcing screw may be rotated relative to said one member without causing axial translation of said screw;

a hub mover threadably engaged with said threaded portion of said forcing screw such that when said forcing screw is rotated and said hub mover is held to prevent rotation with said forcing screw, said hub mover translates axially along said threaded portion of said forcing screw away from said one member and toward the other member, said hub mover comprising a traveling nut threadably engaged with forcing screw; and a pushing piece detachably mounted concentric with said forcing screw such that when said forcing screw is rotated and said traveling nut is held to prevent rotation with said forcing screw, said traveling nut translates axially along said threaded portion of said forcing screw away from said one member and toward said other member so as to abut the pushing piece and translate said pushing piece axially along said forcing screw away from said one member and toward said other member.

3. A hub puller for removing the hub from a wheel bearing, the hub puller comprising:

a frame having a pair of opposed members;

a forcing screw having a threaded portion;

said forcing screw engaging one of said members in such a manner that said forcing screw may be rotated relative to said one member without causing axial translation of said screw;

a hub mover threadably engaged with said threaded portion of said forcing screw such that when said forcing screw is rotated and said hub mover is held to prevent rotation with said forcing screw, said hub mover translates axially along said threaded portion of said forcing screw away from said one member and toward the other member, said frame having a generally U-shaped configuration, said hub mover comprising a traveling nut threadably engaged with said forcing screw; and a pushing piece detachably mounted concentric with said forcing screw such that when said forcing screw is rotated and said traveling nut is held to prevent rotation with said forcing screw, said traveling nut translates axially along said threaded portion of said forcing screw away from said one member and toward said other member so as to abut the pushing piece and translate said pushing piece axially along said forcing screw away from said one member and toward said other member.

4. In a hub puller as in claim 3, said forcing screw having a receiving end, said one member having a recess rotatably receiving said receiver end of said forcing screw.

5. In a hub puller as in claim 3, said forcing screw having a receiver end, said one member having a recess rotatably receiving said receiver end of said forcing screw.

6. A hub puller for removing the hub from a wheel bearing, the hub puller comprising:

a frame having a pair of opposed members;

a forcing screw having a threaded portion;

said forcing screw engaging one of said members in such a manner that said forcing screw may be rotated relative to said one member without causing axial translation of said screw;

a hub mover threadably engaged with said threaded portion of said forcing screw such that when said forcing screw is rotated and said hub mover is held to prevent rotation with said forcing screw, said hub mover translates axially along said threaded portion of said forcing screw away from said one member and toward the other member, said forcing screw having a receiver end, said one member having a recess rotatably receiving said receiver end of said forcing screw; and a ball retained in said recess to reduce friction when said receiver end is rotated in said recess, said ball retained by an O-ring.

7. A device for removing the hub from a wheel bearing within a spindle housing wherein a cylindrical section of the hub is held within the wheel bearing, the device comprising:

a generally U-shaped frame having a generally C-shaped member and an opposed forcing screw receiving member, said C-shaped member presenting a central cavity, said cental cavity being adapted to partially encompass the cylindrical section of the hub, said C-shaped member having an inner face for transferring load to the spindle housing, said receiving member having an inner surface opposed to said C-shaped member, said receiving member having a receiver recess on said inner surface, positioned in opposed relationship to said cental cavity;

a forcing screw having a threaded portion, said forcing screw having a receiver end sized to fit through the hub and into said receiver recess such that rotation of said threaded forcing screw is freely allowed;

a traveling nut threaded to travel along said threaded portion of said forcing screw; and a pushing piece mounted on around said threaded forcing screw between said hub and said traveling nut such that when said threaded forcing screw is rotated and said traveling nut is held to prevent rotation of said traveling nut, said traveling nut moves axially along said threaded portion of said forcing screw, so as to push said pushing piece against said hub and eject said hub out of the wheel bearing.

* * * * *